United States Patent [19]

Beyersdorf

[11] 4,207,487
[45] Jun. 10, 1980

[54] ELECTRIC MACHINE

[76] Inventor: Hartwig Beyersdorf, Konsulweg 28, 2409 Scharbeutz, Fed. Rep. of Germany

[21] Appl. No.: 731,045

[22] Filed: Oct. 8, 1976

Related U.S. Application Data

[63] Continuation of Ser. No. 98,385, Dec. 15, 1970, abandoned.

[30] Foreign Application Priority Data

Dec. 29, 1969 [DE] Fed. Rep. of Germany ....... 1965355

[51] Int. Cl.² .............................................. H02K 1/22
[52] U.S. Cl. ...................... 310/268; 310/64; 310/168
[58] Field of Search .............. 310/268, 168, 266, 112, 310/114, 54, 64; 322/47

[56] References Cited

U.S. PATENT DOCUMENTS

| | | | |
|---|---|---|---|
| 1,165,862 | 12/1915 | Fessenden | 310/169 |
| 3,261,998 | 7/1966 | Bosco | 310/268 |
| 3,428,840 | 2/1969 | Kober | 310/54 |
| 3,432,706 | 3/1969 | Beyersdorf | 310/268 |
| 3,435,267 | 3/1969 | Beyersdorf | 310/268 |
| 3,445,691 | 5/1969 | Beyersdorf | 310/268 |
| 3,469,134 | 9/1969 | Beyersdorf | 310/268 |

FOREIGN PATENT DOCUMENTS 1296699 6/1969 Fed. Rep. of Germany ........... 310/268

*Primary Examiner*—R. Skudy
*Attorney, Agent, or Firm*—Blanchard, Flynn, Thiel, Boutell & Tanis

[57] ABSTRACT

Disc type dynamo-electric machine, especially a generator, having two stators and one rotor, an active air gaps between each stator and the rotor, two annular energizing windings in the stators, and two non-active or auxiliary air gaps are formed in a smooth region between the stators and the rotor, the smooth region being closer to the hub than are the annular windings. The entire rotor is formed at least approximately as a disc of uniform strength. The stators are shaped to conform, in the region of the rotor. The magnet flux successively penetrates the two active air gaps and the two auxiliary air gaps and flows in a radial direction mainly by way of the yokes of the stators. Cooling ribs are provided.

8 Claims, 7 Drawing Figures

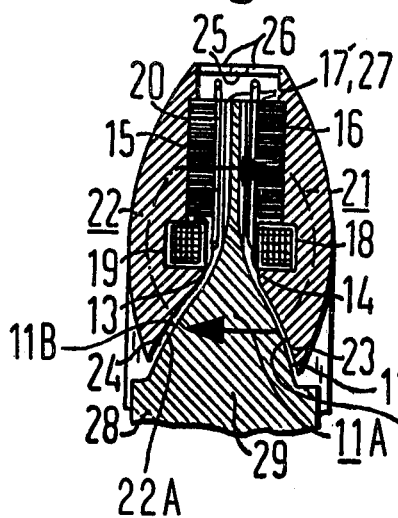
Fig. 1
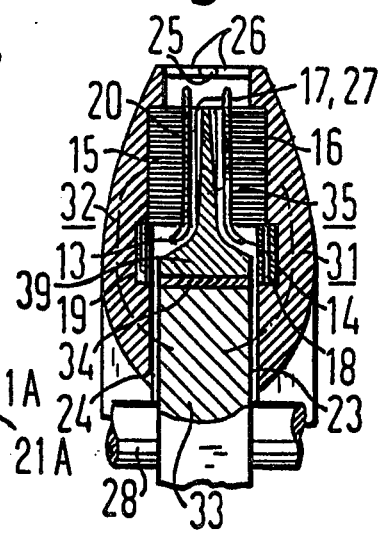
Fig. 6
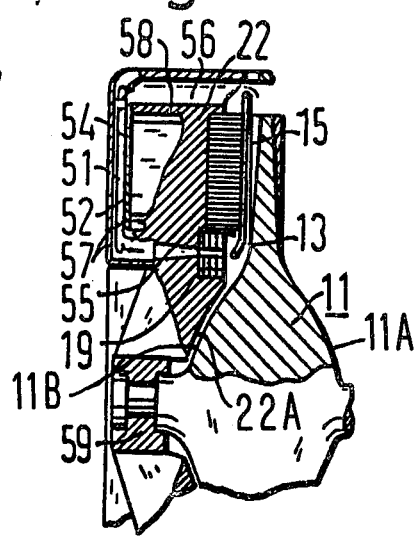
Fig. 7
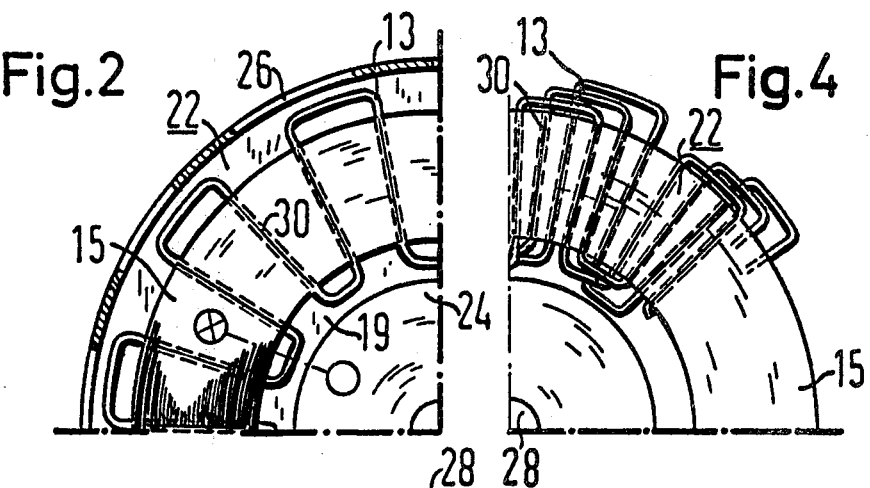
Fig. 2
Fig. 4
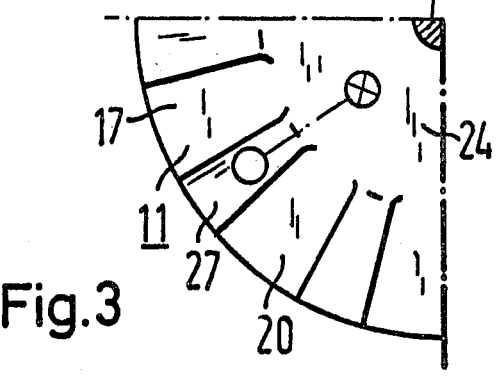
Fig. 3
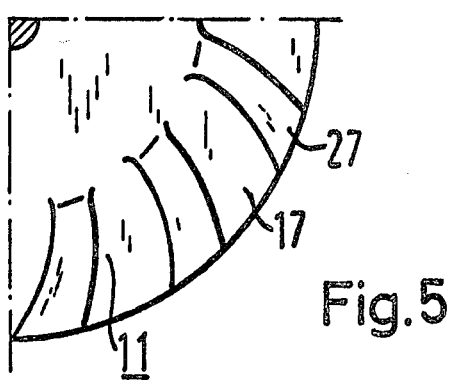
Fig. 5

ELECTRIC MACHINE

This application is a continuation of application Ser. No. 98,385, filed Dec. 15, 1970, now abandoned.

FIELD OF THE INVENTION

My invention relates to a disc type electric machine, especially a generator, having two stators and one rotor, two active air gaps penetrated in the axial direction by the magnetic flux each between a stator and the rotor, means provided in the rotor to achieve flux variations in the active air gaps, alternating-current windings extending approximately radially in the stators, two annular energizing windings provided in the stators and two auxiliary air gaps formed radially inwards of the region of the active air gaps between the stators and the rotor, the magnetic flux passing through the hub part and/or the shaft of the rotor.

BACKGROUND OF THE INVENTION

Such a machine is known for U.S. Pat. No. 3,261,998. This machine is suitable only for low rotational speeds and powers. It is also suitable only as a generator, not as a motor, since in it, sectors of magnetic material provided in the rotor disc extend each to a substantial amount, that is in a large angular region, around the rotor disc.

Disc type generators for high rotational speeds are also known, wherein the rotor, outside the region of the active air gaps, is formed approximately as a disc of uniform strength (Book "Elektrische Maschinen", Authors: Bödefeld and Sequenz, 6th Edition, Page 405; German Pat. No. 228,365). On the other hand, on the region of the active air gaps, the rotor has the form of a flat disc. In order to achieve a great mechanical strength in the rotor construction, the radial height of the active air gap region in these generators is made small compared to the radius of the rotor. Only for this reason, is a low power-weight ratio obtained. This is deteriorated still further by the fact that the energizing windings re arranged radially outside of the rotor and are surrounded on their outside by the edges of the stators, which are connected in U-form so that a very large diameter of the machines results. The large diameter construction results in a large weight for the energizing winding and further results in a great energizing time constant. The long iron path of the magnetic flux also contributes to this.

An electric machine of disc construction style is also known in which the rotor consists of a material having a good magnetic conductivity characteristic and, in the region of the active air gaps, has on both sides thereof teeth formed as ribs with grooves being provided between the ribs (German Pat. No. 1,296,699). In this case, the axial thickness of the rotor diminishes towards the periphery, so that in the region of the active air gaps the rotor is formed approximately as disc of uniform strength. This measure is based upon the problem of achieving a ratio of tooth cross-section to groove cross-section which remains constant over the entire radial height of the active air gap. In this known machine, in departure from that initially mentioned, on each of the two sides of the rotor there are provided two active gap regions lying radially one within the other. The magnetic flux successively penetrates the two radially outer active air gap regions and the two radially inner air gap regions and flows in the radial direction mainly through the yokes of the stators which are remote from the active air gap regions. The energizing windings are arranged in the two stators between the radially outer and the radially inner air gap region. However, this known machine has disadvantages for the two reasons stated hereinafter.

A first reason is that it is necessary not to fall short of a specific minimum diameter of the radially inner active air gap regions. The iron cross-sections which lie in the stator between the alternating-current grooves receiving the alternating-current windings taper radially inwardly toward the shaft by reason of the width of the alternating-current grooves, which remain constant over the radial height of the active air gap regions; and would already terminate on a circle of finite diameter. However, it is not permissable for these iron cross-sections to terminate in a point, since in the region of such points the ratio of the width of the iron cross-section to the width of the alternating-current grooves would be extremely low and unfavorable for the voltage curve form and the efficiency of the machine. Thus, the minimum diameter of the radially inner active air gap region must be selected substantially larger than that diameter on which the possible points of the iron cross-sections would lie. Further the minimum diameter must also be selected sufficiently large so that the winding heads of the alternating-current winding of the radially inner active air gap region can be accommodated within it.

A second reason is that the radial height of the radially inner active air gap region in the known machine is substantially larger than the radial height of the radially outer active air gap region. Both air gap regions are penetrated by the same magnet flux and must therefore have at least approximately the same iron cross-sections lying between the alternating-current grooves. Since the active air gaps have an annular form, their areas and thus also the iron cross-sections, assuming that the edges of the alternating-current grooves extend exactly radially, are in a ratio to one another which is the converse of the ratio of the squares of the mean radii of the active air gaps, that is to say with equal iron cross-section of the two active air gap regions and small mean radius of the radially inner active air gap region, the radial height of the latter must be substantially greater than the radial height of the radially outer active air gap region. Since in fact the edges of an alternating-current groove generally do not extend radially, but parallel with one another, the ratio of the radial heights of the two active air gap regions becomes substantially still poorer. This incidentially becomes more strongly noticeable, the smaller is the minimum diameter selected of the radially inner active air gap region, so that in addition, and for this reason also, the minimum diameter cannot be made very small.

Both reasons set forth above lead to the two active air gaps, lying radially one within the other, necessitating such a great diameter of the machine and thus also of the rotor that the machine in the case of greater powers cannot be constructed for very high rotational speeds. In more recent time there is a need for generators which must, for example, be coupled directly to gas turbines. Rotational speeds can here occur up to 20,000 rpm with powers up to 2,000 kW. At present, no generator is known which masters this rotational speed range with the stated power. Therefore, and at present, this rotational speed is stepped down, with the aid of expensive gearings, in order to drive a generator having a mass of several thousand kilograms.

SUMMARY OF THE INVENTION

An object of my invention is to render possible the construction of an electric generator which reliably masters the stated rotational speed range and which can also be used in the stated power range.

According to my invention, in an electric machine of the initially stated kind, I provide the combination of the following features:

(a) The rotor is made, at last in the region of the active air gaps and at least approximately, as a disc having a uniform strength characteristic, meaning that the disc is, during rotation, subjected to equal forces at all points distributed through it. This result is achieved by making the disc taper radially from inside towards the outside.

(b) The rotor consists of material having a good magnetic conductivity characteristic and, in the region of the active air gaps, has teeth formed as ribs on both sides thereof, between which ribs there lie grooves.

(c) The magnetic flux successively penetrates two active air gaps and two auxiliary air gaps and flows in the radial direction mainly through the yokes of the stators facing away from the active air gaps.

(d) The energizing windings are arranged radially between the regions of the active air gaps and the auxiliary air gaps and, considered from the active air gaps, lie in each case axially behind the radially inner winding heads of an alternating-current winding.

A generator designed in accordance with the invention with the mentioned rotational speed and the mentioned power weighs about 280 kg. A power-weight ratio of 2,000/280 kW per kg, was not hitherto achieved by any known electric machine with rotation speeds of 20,000 rpm. The machine according to the invention is especially suitable for use as a generator, for example for a direct coupling to a turbine. Since an assembly consisting of a turbine and a generator is intended mainly for mobile use, the space and weight advantages are of very great utility. However, the new machine can also be used as a synchronous motor. This property can be used for example for fast running up to the vicinity of the rated rotational speed.

BRIEF DESCRIPTION OF THE DRAWINGS

The invention will be explained in greater detail hereinafter by reference to the drawings, wherein:

FIG. 1 shows a first embodiment of the machine according to the invention in longitudinal section, FIG. 2 shows a partial view of the stator of the machine according to FIG. 1, seen from the air gaps, FIG. 3 shows a partial view of the rotor of the machine according to FIG. 1, seen from the air gaps, FIG. 4 shows a partial view of a stator of a modified embodiment of the alternating-current winding, seen from the air gaps, FIG. 5 shows a partial view of a rotor of a modified embodiment of the magnetically effective teeth, seen from the air gap, FIG. 6 shows a second embodiment of the machine according to the invention in longitudinal section, and FIG. 7 shows a third embodiment of the machine according to the invention in longitudinal section.

DETAILED DESCRIPTION

FIG. 1 shows one of the developments in accordance with the invention. The energizing flux, indicated in dot-and-dash lines, proceeds from the outer periphery 20, in the region of the active air gaps, of the rotor disc 11 by way of the ribs 27, through the laminated stator rings 15, 16 to facilitate a flow of the magnetic flux in many separate paths extending in parallel directions, through the stator yokes 21,22, through the auxiliary air gaps 23,24 and closes itself in the hub part 29 of the rotor disc 11 which is formed for maximum rotational speeds. In other words, the magnet flux successively penetrates the two active air gaps and the two auxiliary air gaps and flows in the radial direction mainly by way of the yokes of the stators on the side thereof facing away of the active air gaps. The mounting of the rotor disc 11 can take place on the projections 28. On the outer edge of the stator yokes 21,22 there are arranged connection elements 26 and a preferably nonmagnetizable intermediate ring 25 for the interception of the magnetic traction forces. In order to obtain a uniform auxiliary air gap, the inner part of the stator yoke 21,22 correspond in shape in this region to the shape of the rotor disc 11. As illustrated in FIGS. 2 and 3, the surfaces of the rotor and the surfaces of the stator yokes which define the auxiliary gaps therebetween are smooth and non-planar and therefore, grooveless and without windings. That is, the surfaces 21A and 22A on the stator yokes 21 and 22, respectively, are concave surfaces and the surfaces 11A and 11B on the rotor disk 11 opposing the surfaces 21A and 22A, respectively, are convex surfaces. To avoid unilateral traction forces admittedly a relatively high equality of the two axial air gap lengths is necessary, which is possible with the aid of high grade or precision mountings. If this condition is fulfilled, it is permissible to provide very small auxiliary air gaps, in favor of a relatively small ampere-turn number of the energizing winding.

FIG. 2 shows a view of the air gap area of the stator yoke 22. Here the diagrammatic course of a single alternating-current winding 13 with the leakage gaps 30 lying before it, the preferably laminated stator ring 15, the energizing winding 19, the auxiliary air gap area 24 and the connection elements 26 may be seen. The magnetic flux generated by the energizing winding 19 is entered in dot-and-dash lines. The arrows and symbols in FIGS. 1 ,2 and 3 in the active air gap indicates the axial entry and in the auxiliary air gap region the axial exit of the magnetic flux. In order to achieve the flux direction shown in FIGS. 1 to 3, the energizing windings 18 and 19 are wound so that the flux around the flux path is added but the flux passing between the energizing windings, namely radially in the rotor 11 is subtracted or zero.

In FIG. 3 there is shown a view of that end of the rotor 11 which faces the end of the stator yoke 22 as represented in FIG. 1. Moreover the ribs 27 and the grooves 17 lying between them in the active air gap region are shown. The rotor 11, formed for maximum rotational speeds, is formed both in the region of the auxiliary air gap 24, that is in the hub 29, and in the outer disc edge 20 somewhat as a disc having a uniform strength characteristic, which cannot be recognized precisely in FIG. 1.

FIG. 4 shows a three-phase alternating-current winding 13. The reference numerals correspond to those of FIG. 2.

In FIG. 5 there is illustrated a development of the ribs 27 provided for the achievement of an alternating-current voltage form which is freer from harmonics. The other reference numerals correspond to those of FIG. 3.

FIG. 6 shows a further development of the invention for high rotational speeds, in which for reasons of avoidance of unilateral axial traction forces in the case of greatly asymmetric air gaps of the rotor 35 a non-magnetizable separating layer 34 is provided and on account of the simpler possibility of production plane auxiliary air gap surfaces penetrated axially by the magnetic flux are provided. This machine in the electrically active part again consists of the stator rings 15,16 containing the alternating-current windings 13,14, the ribs 27 and grooves 17 on the outer rotor disc periphery. The securing elements 26 and the non-magnetizable intermediate ring 25 can likewise be incorporated. The stator discs 31 and 32 are adapted in the region of the auxiliary air gaps 23,24 to the plane end faces of the hub 33. Between the hub 33 and a ring 39 of the rotor disc periphery 20 there is the non-magnetizable separating layer 34. The course of the magnetic flux is here again entered in dot-and-dash lines. For further reduction of the energizing time constant it is further proposed, possibly in place of the hub 33, to provide a return part which can be produced by winding on of a magnetic strip. It can likewise be expedient to this purpose to produce the hub and also the return parts of the stator yokes from a suitable sintered or struck ferrite material.

A further development (not shown) of the invention can effect the further reduction of the unilateral traction forces in the case of asymetric air gaps by the use of cylindrical auxiliary air gaps radially penetrated by the magnetic flux. The electrically active parts correspond then to those in FIG. 6. Since in the case of this solution a relatively large auxiliary air gap diameter is available, this could likewise be made usable for the generation of electric energy. Then admittedly the hub of the rotor necessarily has a greater weight then in tne developments as described above. However the stator yokes become correspondingly lighter, so that the favorable low overall weight of the machine is maintained.

In FIG. 7 a possibility of cooling of the machine is shown. Since in spite of the low weight of the machine according to the invention, a relatively great electric power is generated, it can become necessary to cool the electrically active parts especially intensively. For this purpose, an air current generated by the rotor disc 11 and warmed in the air gap (direction of the arrow in FIG. 7) is re-cooled by way of a system of passages 51 on the back of the stator yoke 22. To achieve an effective re-cooling of the air and direct cooling of the stator yoke, a system of ribs 52,57,58 formed on the outside of the stator yoke is provided, which ribs form at least one cooling medium passage of serpentine form and receive the liquid cooling medium and conduct it, by reason of the great radial height of the ribs 52, over a long path around the stator yoke 22. The advantage of the radial ribs 52 over a cooling system of spiral course as already proposed, is that they can also be used for the return of the magnetic flux. Thus the solid return part of the stator yoke can be of correspondingly smaller dimensions. An annular closure part 54 seals off the back of stator yoke and works as a heat exchanger. The re-cooled air can then be conducted through openings 55 to the energizing winding 19, in order to cool the latter and the alternating-current winding 13 and the rotor 11, and also the air gap area of the stator ring 15. The air return can take place through the passages 56. FIG. 7 further shows the possibility of accommodation of the bearing 59.

What I claim is:

1. A disc-type dynamo-electric machine, especially a generator, comprising:
   two opposed and spaced apart annular stator yokes each having a radially inner part and a radially outer part, only said radially outer parts having means defining opposed stator rings thereon, said stator rings each having opposed, planar and radially extending surfaces thereon and alternating-current winding means on said stator rings, said radially inner parts being free of alternating-current winding means, said radially inner parts having substantially axially facing, opposed, smooth and concave surfaces thereon;
   two annular energizing windings, one each being mounted on said stator yokes in a location between and mutually adjacent to said radially inner parts and said radially outer parts; and
   a rotor of good magnetic conductivity mounted in the spacing between said two annular stator yokes and having a hub with a greater axial dimension than at the radially outer portion of said rotor and a uniform strength characteristic, said hub being positioned between said radially inner parts of said stator yokes and having a pair of oppositely facing smooth and convex surfaces opposing said smooth and concave surfaces on said radially inner parts of said stator yokes to define a pair of non-planar and uniform auxiliary air gaps therebetween, the radially outer portion of said rotor being that part which extends between said two annular energizing windings and said stator rings, said radially outer portion of said rotor having circumferentially alternating ribs and grooves on both axially facing surfaces, said ribs and grooves extending radially coextensively with said stator rings, the surfaces of said ribs being parallel to said surfaces on said stator rings to define a pair of planar active air gaps therebetween, the area of each of said auxiliary air gaps being generally as large as the sum of the surfaces of the ribs on the rotor facing one of said active air gaps.

2. A disc-type dynamo-electric machine according to claim 1, wherein the surface of the rotor in the region of the active air gaps consists of a ferritic material generating low electric and magnetic losses.

3. A disc-type dynamo-electric machine according to claim 1, wherein the edges of the ribs of the rotor deviate from a precisely radial course.

4. A disc-type dynamo-electric machine according to claim 1, wherein the stators comprise parts in which the magnetic flux flows in many separate paths extending in parallel directions.

5. A disc-type dynamo-electric machine according to claim 1, wherein the energizing windings are positioned in the direction seen from the active air gaps, in each case axially behind the radially inner winding heads of said alternating-current winding means.

6. A disc-type dynamo-electric machine according to claim 1, wherein for the purpose of cooling, a system of predominately axially and radially extending ribs is provided on said stator yokes remote from the air gaps forming a conduit for a liquid cooling medium, and a conduit for said air in heat exchange relationship with the liquid cooling medium.

7. A disc-type dynamo-electric machine according to claim 1, wherein said two annular energizing windings are wound so that the magnetic flux generated thereby is additive around the periphery of both of said energizing windings whereby the resultant radial magnetic flux is mainly in said stator yokes.

8. A disc-type dynamo-electric machine according to claim 1, including means for directing the magnetic flux successively through said two active air gaps, said two auxiliary air gaps and radially by way of said stator yokes.

* * * * *